United States Patent [19]
Kim

[11] Patent Number: 5,881,147
[45] Date of Patent: Mar. 9, 1999

[54] RING VARYING TECHNIQUE FOR A TELEPHONE

[75] Inventor: Jong-Kwang Kim, Gumi, Rep. of Korea

[73] Assignee: SamSung Electronics Co., Ltd., Suwon, Rep. of Korea

[21] Appl. No.: 728,686

[22] Filed: Oct. 10, 1996

[30] Foreign Application Priority Data

Oct. 16, 1995 [KR] Rep. of Korea .................. 1995 35658

[51] Int. Cl.$^6$ .............................. H04M 3/00; H04M 5/00; H04M 1/00
[52] U.S. Cl. ......................... 379/373; 379/374; 379/375; 379/251; 379/252
[58] Field of Search ..................................... 379/373, 374, 379/375, 252, 251, 179, 418, 372, 177, 188, 199, 361, 352

[56] References Cited

U.S. PATENT DOCUMENTS

| | | | |
|---|---|---|---|
| 4,282,410 | 8/1981 | Gauthier et al. | 379/418 |
| 4,349,703 | 9/1982 | Chea, Jr. | 379/382 |
| 4,508,937 | 4/1985 | Berger et al. | 379/374 |
| 4,631,361 | 12/1986 | Miller | 379/351 |
| 4,866,766 | 9/1989 | Mitzlaff | 379/374 |
| 4,924,511 | 5/1990 | Burns et al. | 379/418 |
| 4,972,466 | 11/1990 | Quesnel et al. | 379/375 |
| 5,099,513 | 3/1992 | Kim et al. | 379/374 |
| 5,323,456 | 6/1994 | Oprea | 379/375 |
| 5,452,354 | 9/1995 | Kyronlahti et al. | 379/375 |
| 5,491,746 | 2/1996 | Pinard | 379/373 |
| 5,598,461 | 1/1997 | Greenberg | 379/374 |
| 5,649,007 | 7/1997 | Yamada | 379/375 |

Primary Examiner—Krista Zele
Assistant Examiner—Benny Q. Tieu
Attorney, Agent, or Firm—Robert E. Bushnell, Esq.

[57] ABSTRACT

A technique for selectively storing as a selected ring one of various rings programmed in a ROM within a controller of a telephone which has a controller for storing a program for various rings therein, an output key for confirming the stored rings, and a selection key for selecting a ring, the technique including the steps of: storing as a selected ring one of the rings stored in the controller; and transmitting the selected ring stored in step in response to a call signal being inputted.

3 Claims, 2 Drawing Sheets

RING VARYING TECHNIQUE FOR A TELEPHONE

CLAIM OF PRIORITY

This application makes reference to, incorporates the same herein, and claims all benefits accruing under 35 U.S.C. §119 from an application for Ring Varying Method For Telephone earlier filed in the Korean Industrial Property Office on 16 Oct. 1995 and there duly assigned Ser. No. 35658/1995.

BACKGROUND OF THE INVENTION

Field of the Invention

The present invention relates to a ring varying technique for a telephone, and more particularly, to a technique for transmitting a preselected ring from among various rings programmed in a read only memory (hereinafter, referred as to ROM) when a call signal is received by the telephone.

Description of the Related Art

Conventionally, if a call signal is generated, a ring is transmitted. The transmitted ring is set to one format, which is commonplace to a user. It is almost impossible for the user to select his or her desired kind of ring.

Earlier efforts in the art including Mitzlaff, U.S. Pat. No. 4,866,766, which provided a Telephone Device Having Customized Ring Capability, sought to endow a telephone device with a customized ring capability utilizing a conventional keypad in the telephone in order to allow the user to program a custom ring tone and pattern into the telephone set.

More recent efforts in the art, represented by Kyronlahti et al., U.S. Pat. No. 5,452,354, entitled Ringing Tone Apparatus, attempts a technique for setting the ringer tone on a radio telephone apparatus. As illustrated in FIG. 3 of Kyronlahti et al., a new ringer tone is randomly generated and then demonstrated and the telephone then waits for another key to be pressed, namely, an arrow down key being pressed which causes the telephone to generate a new random ringer tone or an arrow up key being pressed which causes the telephone to again demonstrate the last tone generated or a memory key being pressed which sets the last tone generated as the personal tone of the user.

While both Kyronlahti et al. and Mitzlaff endeavor to provide some improvement in the art, I have found that the programming of the telephone to produce a desired preselected ring is far more complicated in the approaches attempted by Kyronlahti et al. and Mitzlaff than is either practical or necessary.

SUMMARY OF THE INVENTION

Therefore, it is an object of the present invention to provide an improved telephone set.

It is another object to provide a technique for selecting one of various rings programmed in a ROM within a controller.

It is still another object of the present invention to provide a technique of transmitting a preselected ring when a call signal is inputted.

These and other objects can be accomplished according to the present invention with a ring varying technique for a telephone by using a controller for storing a program for various rings therein, an output key for confirming the stored rings, and a selection key for selecting a ring. In the practice of the present invention, a ring stored in the controller is selected, and the selected ring is transmitted when a call signal is inputted.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
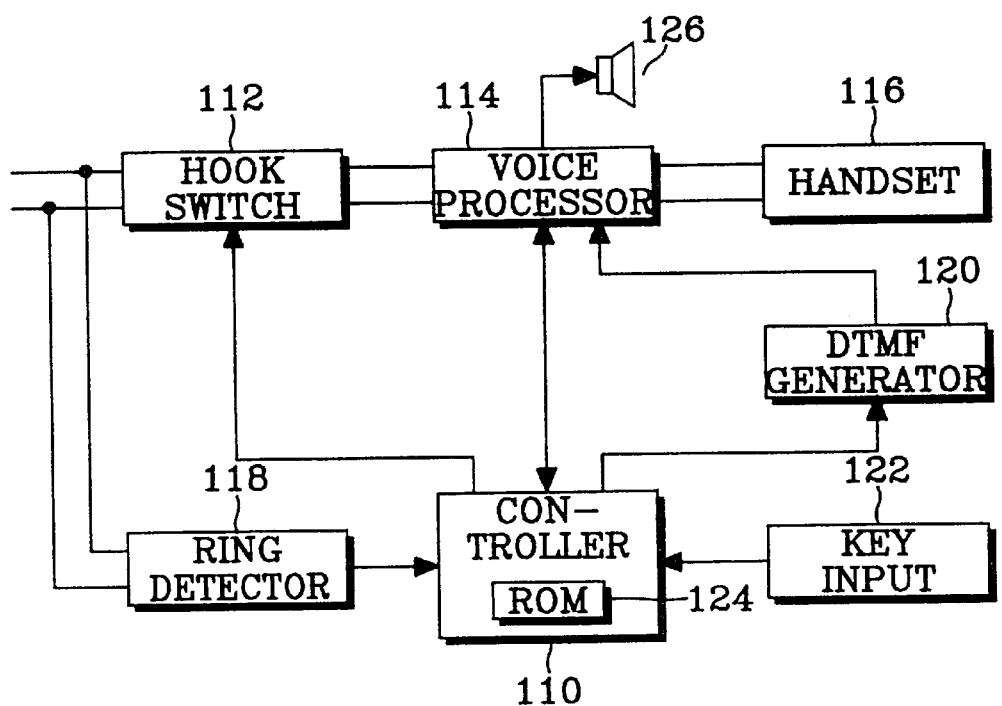
FIG. 1 is a block diagram illustrating the construction of a telephone for use in the practice of the present invention.

Throughout the drawings, it is noted that the same reference numerals or letters were used to designate like or equivalent elements having the same function. Further, in the following description, numerous specific details have been set forth to provide a more thorough understanding of the present invention. It will be apparent, however, to one skilled in the art that the present invention may be practiced without these specific details. A detailed description of known functions and constructions unnecessarily obscuring the subject matter of the present invention has been avoided for the sake of clarity.

Referring to FIG. 1, a controller 110 controls the overall operation of the telephone and, if an output key or a selection key is operated so as to result in a corresponding signal being inputted from a key input 122, outputs rings in a programmed sequence thereof or stores a selected ring. Also, upon a call signal being inputted, the controller 110 controls the operation of the telephone so that the stored ring is transmitted. A hook switch 112 forms a voice speech path between the telephone and a central office line under the control of the controller 110. A voice processor 114 is switched with a handset 116 under the control of the controller 110 so as to execute speech with the handset 116. The handset 116 inputs and outputs a speech voice signal to the voice processor 114. A ring detector 118 connected to the central office line fed into the telephone detects a ring corresponding to the received call signal, thereby supplying a detected ring signal to the controller 110. A ROM 124, provided within the controller 110, stores an operation control program of the telephone and a program for various rings thereat. The key input 122 including a multiplicity of various keys, supplies key command signals and key data signals generated according to the operation of the key s to the controller 110. Further, for instance, the key input 122 is provided with an output key for causing the outputting of the rings stored in the ROM 124 in the programmed sequence and a selection key for selectively storing the selected output ring.

Figure 2:
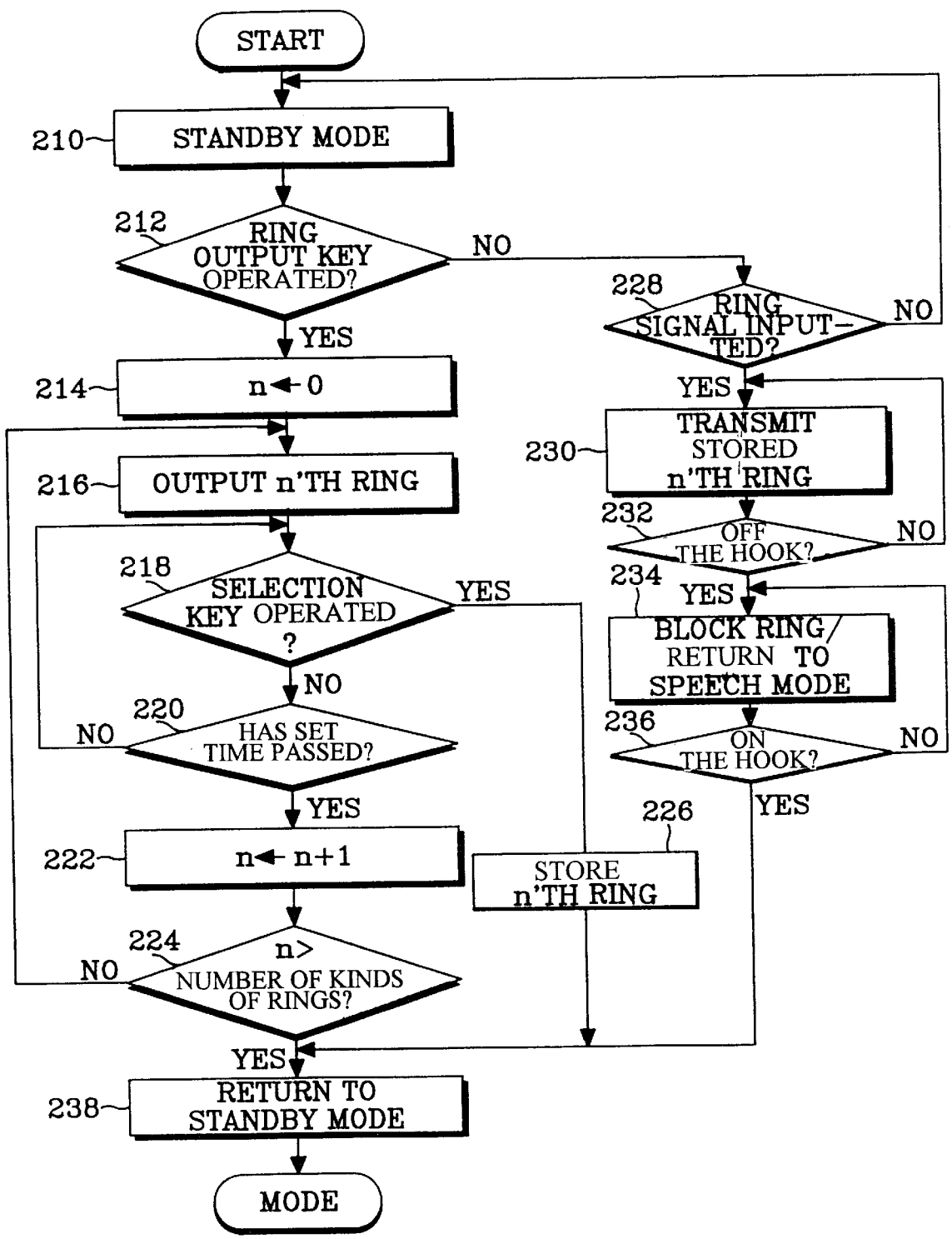
FIG. 2 is a flowchart illustrating the steps for varying rings for a telephone according to the principles of the present invention.

FIG. 2 is a flowchart illustrating the steps for varying rings for the telephone according to the present invention, which includes the steps of; outputting various rings in the programmed sequence when the output key is operated: storing the corresponding ring when the selection key for selecting the output ring is operated; and, transmitting the stored ring when the ring signal corresponding to the call signal has been inputted.

During a standby mode of the telephone, in step 212, the controller 110 senses whether or not the output key for detecting various rings programmed in the ROM 124 provided within the controller 110 has been operated so as to cause a corresponding signal to be inputted from the key input 122. If the controller has sensed, in step 212, that the output key was operated, the controller 110 sets a counter value n equal to zero "0" for selecting various rings in step 214. Thereafter, in step 216, the controller 110 reads the ring corresponding to the counter value n from the ROM 124 and outputs the read ring via a speaker 126. The controller 110 then senses, in step 218, whether or not the selection key for selectively storing the ring output in step 216 has been operated. If the controller has detected that the selection key was operated, then the controller 110 proceeds to step 226, to thereby store a selected n'th ring. However, if the controller has detected that the selection is key was not operated, then the controller 110 checks, in step 220, whether or not a predetermined period of time has passed. Upon a determination that the predetermined period of time has passed, the controller 111 increases the counter value n by one in step 222. The controller 110 then checks, in step 224, whether or not the counter value n is greater than the number of kinds of rings stored in the ROM 124. If the counter value n was greater than the number of kinds of rings stored therein, the controller 110 determines that all rings have been outputted and then returns to the standby mode in step 238.

In step 228, the controller 111 checks whether or not the incoming of the ring signal corresponding to the call signal has been detected by the ring detector 118. If the ring signal has been detected, in step 230, the controller 110 then reads the stored n'th ring in the ROM 124 of the controller 110 and transmits the read n'th ring through the speaker 126. Following that, once the controller 110 has determined that the handset 116 has been taken off the hook in response to the ring in step 232, the controller 110 proceeds to step 234, to block the transmission of the ring and to return to a speech mode. When the controller has determined, in step 236, that an on the hook state has been detected, the controller 110 proceeds to step 238, thereby returning to the standby mode.

As may be apparent from the foregoing, the present invention is advantageous in that various kinds of rings are programmed in the ROM provided within the controller so that the user can selectively store his or her desired kind of ring and the stored ring can be supplied upon receiving a call.

While there have been illustrated and described what are considered to be preferred embodiments of the present invention, it will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A ring varying method for a telephone which has a controller for storing a program for various rings therein, an output key for confirming said stored rings, and a selection key for selecting a ring, said method comprising the steps of: selecting one of the various rings stored in said controller by:

outputting rings in a sequence in which said rings are programmed in said controller in response to said output key being operated; and storing one of said rings as a selected ring in response to said selection key being operated in response to an outputted ring; and transmitting said selected ring upon a determination that a call signal has been inputted;

further comprising the step of outputting a next stored ring in an absence of said selection key being operated during a predetermined period of time after outputting rings in a sequence during the ring selection step.

2. A telephone apparatus comprising:

a controller including a memory, said controller controlling the operation of the apparatus;

a hook switch connected to a voice processor which is in turn connected a handset, said hook switch being connected to a telephone line for selectively passing electrical signals between said handset and said telephone line via said voice processor;

a dual tone multi-frequency generator connected to said voice processor and controlled by said controller for generating dual tone multi-frequency signals to be output to said telephone line via said voice processor and hook switch;

a ring detector connected to said line for detecting a call signal on said telephone line and for outputting a signal to said controller in response thereto; and a key input including an output key and a selection key, said key input being connected to said controller;

said memory of said controller storing n different rings therein and said controller including a counter for counting up to n, n being a positive integer, such that upon a determination by said controller that said output key has been operated, said counter is set equal to zero and said controller causes said voice processor to output the n'th ring;

said controller then determines if said selection key has been operated and if said selection key has been operated, said controller stores the n'th ring as a selected ring and then returns the telephone apparatus to its stand-by mode and alternatively, if said controller determines that said selection key has not been operated for a predetermined period of time after said n'th ring has been outputted, said controller increases the count in said counter by one and then determines if the count in the counter is greater than the number of kinds of rings stored in said memory and if so, returns the telephone apparatus to its stand-by mode and if not causes the output of the n'th ring and again determines if said selection key has been operated; and upon a ring signal being inputted from said telephone line as detected by said ring detector, said controller transmits said stored n'th ring until such time that said hook switch has been taken off the hook at which time said controller ends the transmission of said n'th ring and returns the telephone apparatus to a speech mode until such time that said controller has determined that the hook switch has been placed in the on-hook condition at which time it returns the telephone apparatus to its stand-by mode.

3. A telephone apparatus comprising:

a controller for storing program for various rings therein;

an output key for confirming said stored rings;

a selection key for selecting a ring;

a user of said telephone apparatus selecting one of said rings by operating said output key, said controller outputting rings in a sequence in which said rings are programmed in said controller in response to said output key being operated;

said user selecting one of said sequentially output rings by operating said selection key, said controller storing one of said rings as a selected ring in response to said selection key being operated in response to an outputted ring; and said controller transmitting said selected ring upon a determination that a call signal has been inputted to the telephone apparatus:

wherein said controller outputs a next stored ring in an absence of a determination that said selection key has been operated by a user during a predetermined period of time after outputting rings in a sequence during the ring selection.

* * * * *